United States Patent
Casanova et al.

(10) Patent No.: US 6,657,993 B1
(45) Date of Patent: Dec. 2, 2003

(54) SYSTEM AND METHOD FOR VARIABLE BANDWIDTH TRANSMISSION FACILITIES BETWEEN A LOCAL TELEPHONE SWITCH AND A REMOTE LINE UNIT

(75) Inventors: Lynn Marie Casanova, Lockport, IL (US); Dana Beverly Robinson, Chicago, IL (US); Paul Raymond Sand, Woodridge, IL (US); Claudis L. Young, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/309,349

(22) Filed: May 11, 1999

(51) Int. Cl.$^7$ ................................................ H04L 12/28
(52) U.S. Cl. ...................................... 370/352; 370/230
(58) Field of Search ................................. 370/352, 450, 370/493, 230, 477

(56) References Cited

U.S. PATENT DOCUMENTS

| | | | |
|---|---|---|---|
| 5,555,244 A | | 9/1996 | Gupta et al. |
| 5,724,355 A | * | 3/1998 | Bruno et al. ................. 370/410 |
| 5,917,804 A | * | 6/1999 | Shah et al. .................. 370/230 |
| 6,215,796 B1 | * | 4/2001 | Smith, Jr. .................... 370/493 |
| 6,438,141 B1 | * | 8/2002 | Hanko et al. ................ 370/477 |

FOREIGN PATENT DOCUMENTS

| | | | |
|---|---|---|---|
| EP | 0824298 | 2/1998 | ............ H04Q/11/04 |
| EP | 0829995 | 3/1998 | ............ H04M/3/00 |
| GB | 2311690 | 1/1997 | ............ H04L/12/64 |

OTHER PUBLICATIONS

Haselton, E. F., "A PCM Frame Switching Concept Leading To Burst Switching Network Architecture", Integrating Communication For World Progress, IEEE ICC, vol. 3, Boston, MA, Jun. 19–22, 1983 pp. 1401–1406.

* cited by examiner

Primary Examiner—Salvatore Cangialosi
(74) Attorney, Agent, or Firm—Michael B. Johannesen; Steven R. Santema

(57) ABSTRACT

A system and method that uses the flexible bandwidth of a data network in order to provide more flexible services to remote line units comprises a telephone switch configured to provide telephony service to a wireline terminal and an access network head end connected via circuit switch transmission facilities to the telephone switch and configured to manage bearer channels in a data network. The system also includes a data network carrying the bearer channels and a line unit separate from the telephone switch connected to the data network and to the wireline terminals configured to interface wireline terminals to one of the bearer channels. The access network head end reserves a predetermined bandwidth through the network and allocates a portion of the bandwidth to each of the line units. The amount of bandwidth allocated to each line unit is variable.

9 Claims, 5 Drawing Sheets

SYSTEM AND METHOD FOR VARIABLE BANDWIDTH TRANSMISSION FACILITIES BETWEEN A LOCAL TELEPHONE SWITCH AND A REMOTE LINE UNIT

CROSS-REFERENCE TO RELATED APPLICATION

This patent application is related to U.S. patent application Ser. No. Casanova 09/309,348 entitled "System And Method For Using A Data Network As A Transmission Medium In A Local Telecommunications Loop", filed concurrently with this application, now pending.

FIELD OF THE INVENTION

This invention relates to local telephone service, and, more particularly, to the area of providing an economic, flexible transmission medium between the serving switch and remote line units.

BACKGROUND OF THE INVENTION

The increase in the number of telephone lines in use has exceeded the expectations of even the most optimistic operating company. Such increases, while good for revenue, require operating companies to scramble for equipment to support all of the new telephone lines being installed throughout its service region. In predigital days, a new switching office was required every time a previous switching office's capacity was exceeded. In more modern times, remote line units connected to a switching system via trunk group has increased the range and the capacity of modern switches. However, operating companies must provision their equipment for worst case (or near worst case) usage, which leads to overbuilding the system hence unnecessary cost.

An example of the current art is shown in FIG. 1. In a local service area 10, a telephone switching system ("switch") such as a 5ESS® switch manufactured by Lucent Technologies is connected to the public switch telephone network (PSTN) 14 via a plurality of lines and trunk groups. The PSTN 14 comprises other local switches, long distance switches, wireless systems, etc. In order to support the diverse residential and business locations a telephone switch 12 is connected to one or more subscriber loop carriers illustrated here by subscriber loop carrier (SLC) 16 and 18. Subscriber loop carrier 16 serves analog (plain old telephone service or POTS) telephones 20 and 22 and ISDN telephone 24 in residential area 26. Subscriber loop carrier 18 is shown as supporting a plurality of telephone systems represented by POTS telephone 30 and ISDN telephones 32 and 34 in business campus 36. Each SLC 16 and 18 provides the basic battery, over voltage, ringing, supervision, hybrid and testing (BORSHT) functions for its respective subscriber telephones and multiplexes traffic for their respective subscriber telephones on trunk groups 40 and 42, respectively. In the current art, trunk groups 40 and 42 are optical trunk groups that have a large bandwidth. Each trunk 40 and 42 is connect to a host terminal 44 and 46. Host terminals 44 and 46 provide conversion of calls from the transmission format to a line appearance at telephone switch 12. In this manner, calls. destined, for example, for telephone 20 appears to telephone switch 12 to be a line directly connected to switch 12.

A problem in the art, however, is that the maximum anticipated traffic must be supported by both subscriber loop carrier 16 and subscriber loop carrier 18. Therefore, the business campus must be able to support maximum usage (usually, Monday morning between the hours of 9:00 and 11:00) and thus host terminal 46, trunk 42 and subscriber loop carrier 18 must have the capacity to carry such traffic. Conversely, residential area 26 must be engineered to carry traffic for peak usage days (such as Mother's Day, Christmas Day, etc.) expected in the residential area. Thus, host terminal 44, trunk 40 and subscriber loop carrier 16 are engineered to a maximum bandwidth capacity for such traffic.

From the above scenario, it is clear that the operating company of telephone switch 12 has capacity that it is not using. When telephone usage at the business campus is at its peak, the residential area 26 is generally at its lowest. Conversely, when residential usage 26 is at its peak, telephones on the business campus 36 is not in high use. Thus, depending on the time of day (and day of the week) much of the capacity of one or the other subscriber loop carrier 16 or 18 is being underutilized while, conversely, the capacity of the other subscriber loop carrier is being pushed near its limit.

Therefore, a problem in the art is that there is no dynamic, flexible manner in which to allocate bandwidth to remote subscriber loop carriers

SUMMARY OF THE INVENTION

This problem is solved and a technical advance is achieved in the art by a system and method that uses the flexible bandwidth of a data network in order to provide more flexible services to wireline terminals. The system comprises a telephone switch configured to provide telephony service to a plurality of wireline terminals and an access network head end connected via circuit switch transmission facilities to the telephone switch and configured to manage reserved data bandwidth ("bearer channels") in a data network. The system also includes a data network carrying the bearer channels and a line unit separate from the telephone switch connected to the data network and to the wireline terminals configured to interface wireline terminals to one of the bearer channels. The access network head end has a controller having a table for translating line identification to a line unit address in the data network. The access network head end allocates a portion of its reserved bandwidth to each remote line unit with which it is associated. The amount of bandwidth is variable so that the access network head end can change the allocation to support changing traffic patterns according to time of day, day of week, etc.

BRIEF DESCRIPTION OF THE DRAWINGS

A more complete understanding of the invention may be obtained from consideration of the following description in conjunction with the drawings in which.

DETAILED DESCRIPTION OF THE INVENTION

Figure 1:
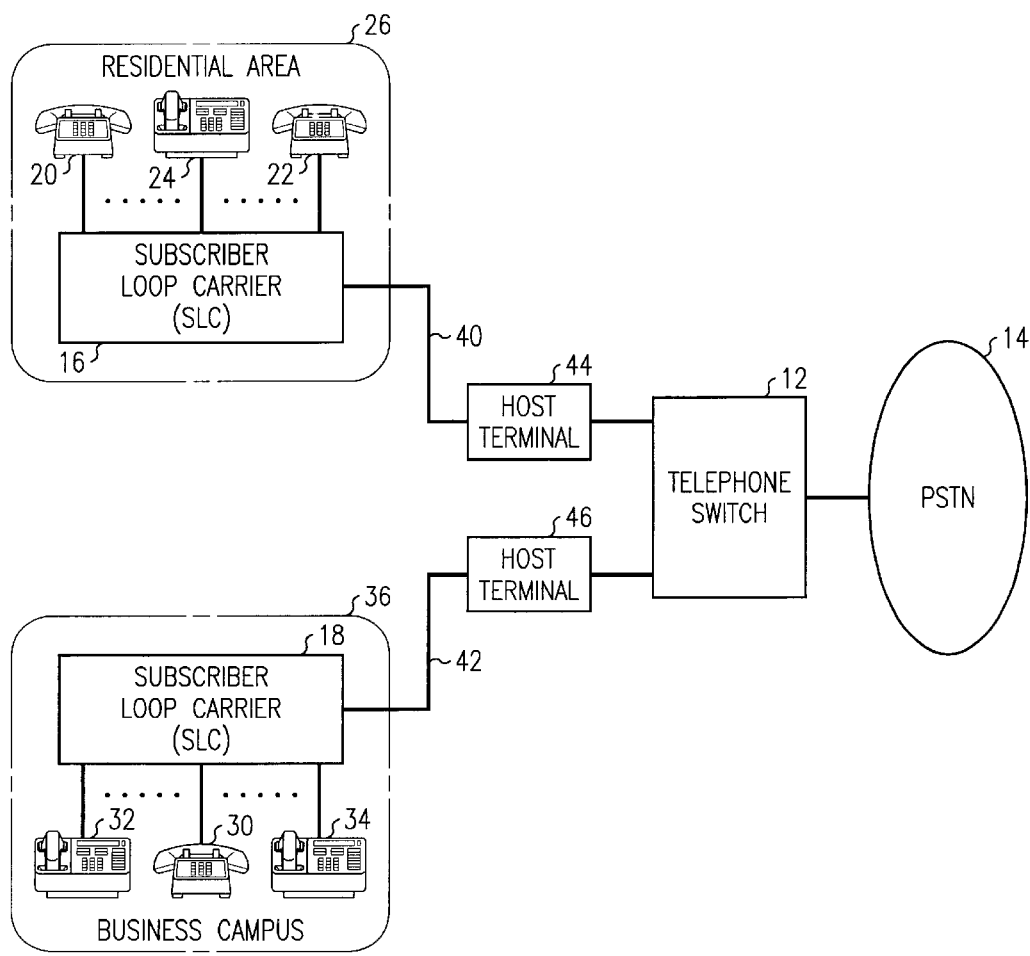
FIG. 1 is a block diagram of a prior art telephone switch and remote subscriber loop carrier.
Figure 2:
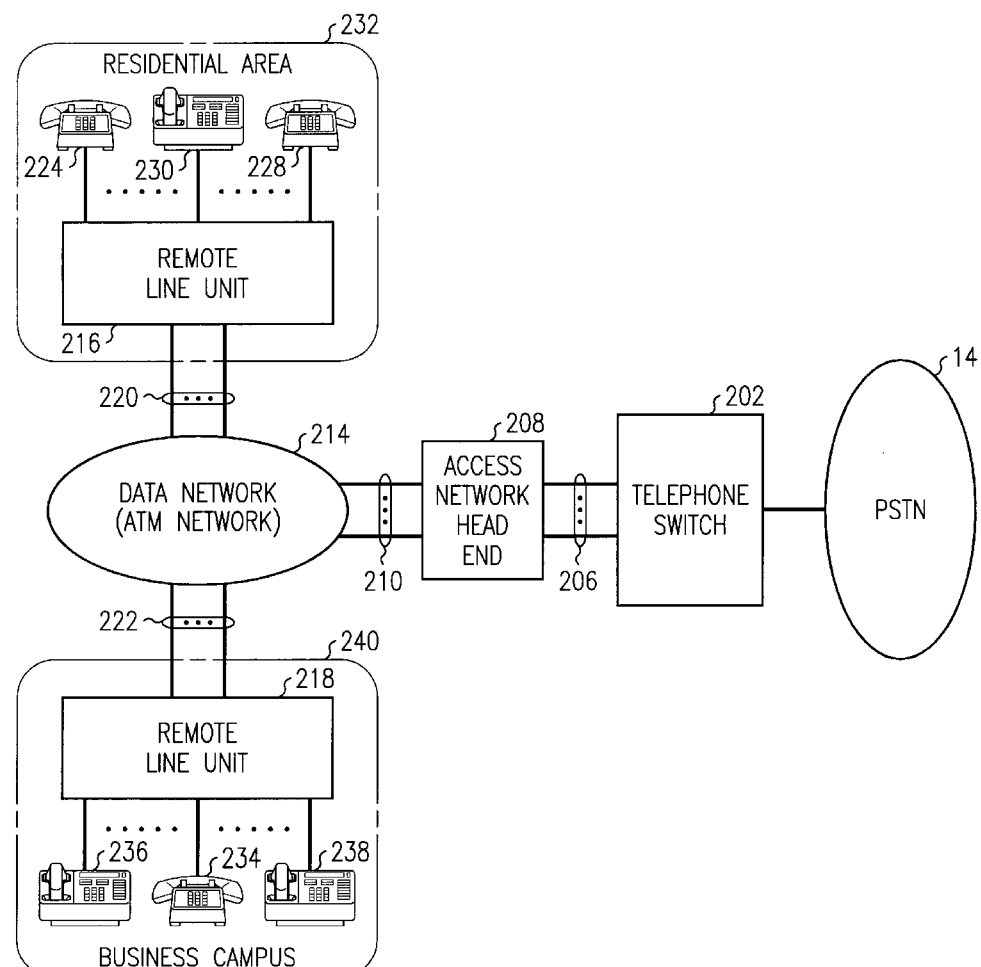
FIG. 2 is a block diagram of a telephone switch that supports a plurality of remote line units according to an exemplary embodiment of this invention.

FIG. 2 illustrates a block diagram of a telephone network 200 that provides remote line units connected to the telephone switch through a data network according to an exemplary embodiment of this invention. In this exemplary embodiment, PSTN 14 is connected to a telephone switch 202. Telephone switch is connected by one or more trunk groups 206 to an access network head end 208. Only one access network head end 208 is needed for a plurality of remote line units, thus, providing a cost saving over the one-to-one host terminals (44 and 46 FIG. 1).

Access network head end 208, as will be described further below, communicates with telephone switch 202 by means of V5, TR303 or some form of proprietary protocol as is known in the art. For example, in FIG. 1 the host terminals 44 and 46 communicate with subscriber loop carriers 16 and 18 (respectively). Access network head end determines the destination of a call and delivers the call and converts the information including signaling into data packets and sends them out via line 210 which, in this exemplary embodiment, may be an OC3-based link.

Information is received in data network 214 and routed to its destination. In this exemplary embodiment, data network 214 comprises an ATM network wherein the data is packetized and put into the payload of an ATM cell as is known in the art. However, ATM is only exemplary. Other forms of data networks can be used without departing from the scope of this invention.

Data network 214 delivers data packets addressed to remote line units 216 and 218, in accordance with one aspect of this invention. Remote line units 216 and 218 may be connected to data network 214 via OC3 links, for example, or some other form of optical or metallic trunk groups 220 and 222.

Remote line unit 216 provides telephone services for analog telephones 224 and 228 and digital (such as ISDN) telephones 230 according to this exemplary embodiment of this invention. Of course, remote line unit 216 may support a large number of telephone terminals, depending upon the mix of analog and digital terminals and the traffic in the area served. In this exemplary embodiment, remote line unit 216 serves a residential area 232.

Likewise, remote line unit 218 supports a plurality of analog telephones represented by analog telephone 234 and digital phones represented by ISDN phones 236 and 238. Remote line unit 218 serves a business campus 240.

In the telephone network of 200, access network head end 208 sets up one or more "bearer channels" to each remote line unit 216 and 218. In other words, a predetermined amount of data packet traffic through data network 214 is reserved, in order to maintain the bandwidth necessary to sustain voice-quality service. In this manner, the access network head end 208 can control and maintain its required bandwidth through data network 214 without having to allocate data packets on an "as needed" basis, which could cause delay in delivery of packets. Such delay would cause the voice channels to deteriorate to unacceptable quality.

To this end, access network head end 208 may allocate more bandwidth to remote line unit 218 during the day in order to serve business campus 204, and allocate more bandwidth in the evening so that remote line unit 216 servicing residential area 232 receives more service. In this manner, the operating company of network 200 does not have to "overbuild" the network and have maximum bandwidth available for either remote line units 216 or 218. Access network head end 208 dynamically changes bandwidth allocations among the various line units that it serves. If, for example, there were a fire or other disaster in residential area 232, access network head end 208 would detect the increase in traffic and could allocate more bandwidth temporarily through data network 214 in order to support emergency activity.

Figure 3:
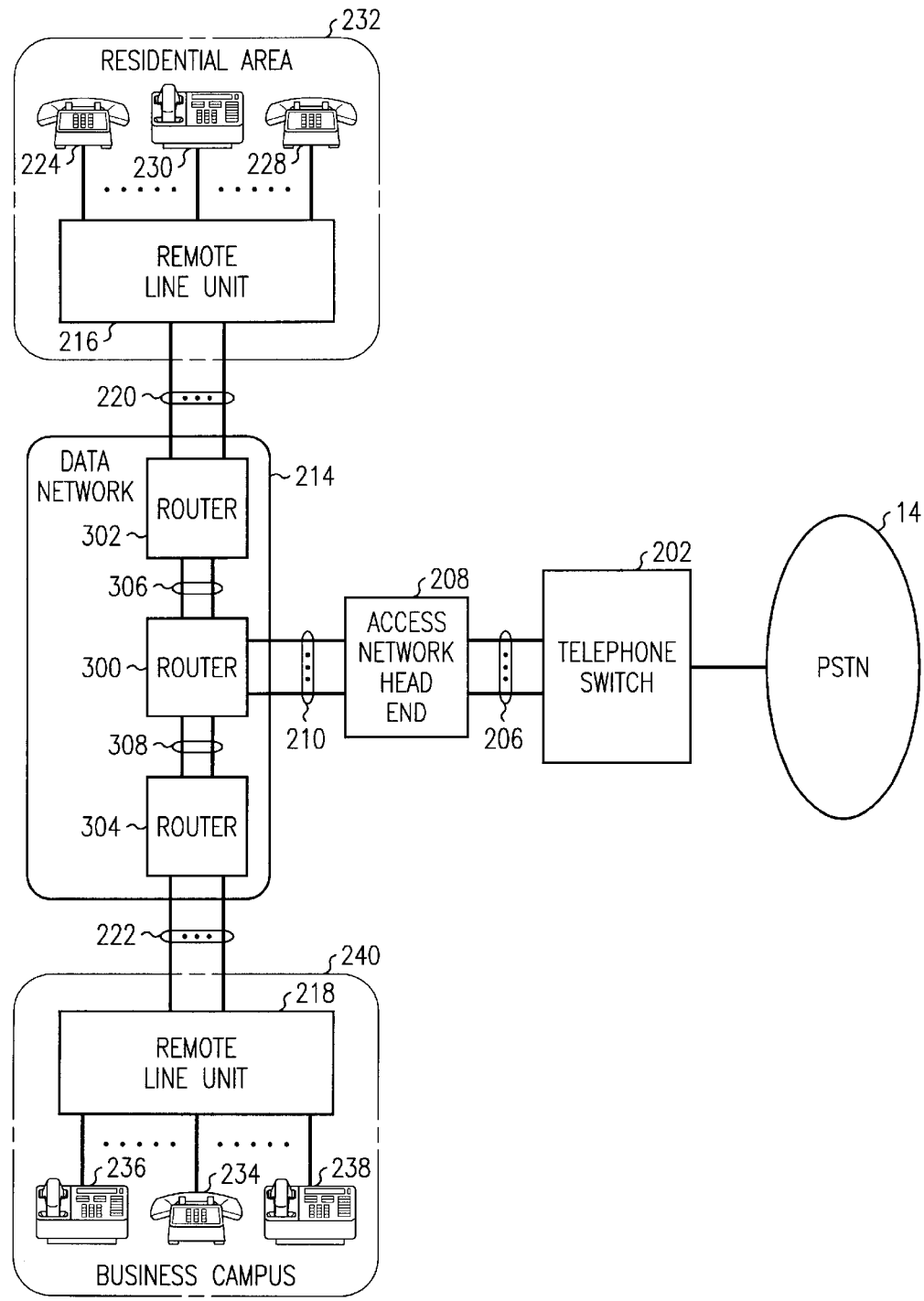
FIG. 3 is a block diagram illustrating allocation of bandwidth through the data network in the system of FIG. 2.

FIG. 3 illustrates allocation of data network 214 bandwidth according to one aspect of this invention. In order to provide voice quality service through data network 214, there must be a minimum guaranteed bandwidth through the data network 214 (that is, a certain guaranteed amount of packet traffic) between remote line unit 216 and access head end 208 and remote line unit 218 and access network 208. Therefore, the system 10 is guaranteed a certain amount of packet traffic through data network 214. According to this embodiment of this invention, a router 300 is connected to access network head end 208 via one or more trunk groups to a 210 within data network 214. Router 300 allocates a predetermined amount of packet traffic to router 302 and a second predetermined amount of packet traffic to router 304. Such pre-allocated packet traffic is sometimes referred to as "packet pipes" as illustrated by 306 and 308. In the illustration of FIG. 3, router 300 allocates more bandwidth to its connection to business campus 240 than it does to residential area 232. This would be a desirable configuration, for example, during a week day. Of course, data network 214 may include further routers, terminations, etc. that are not shown in this illustration for purposes of clarity.

Figure 4:
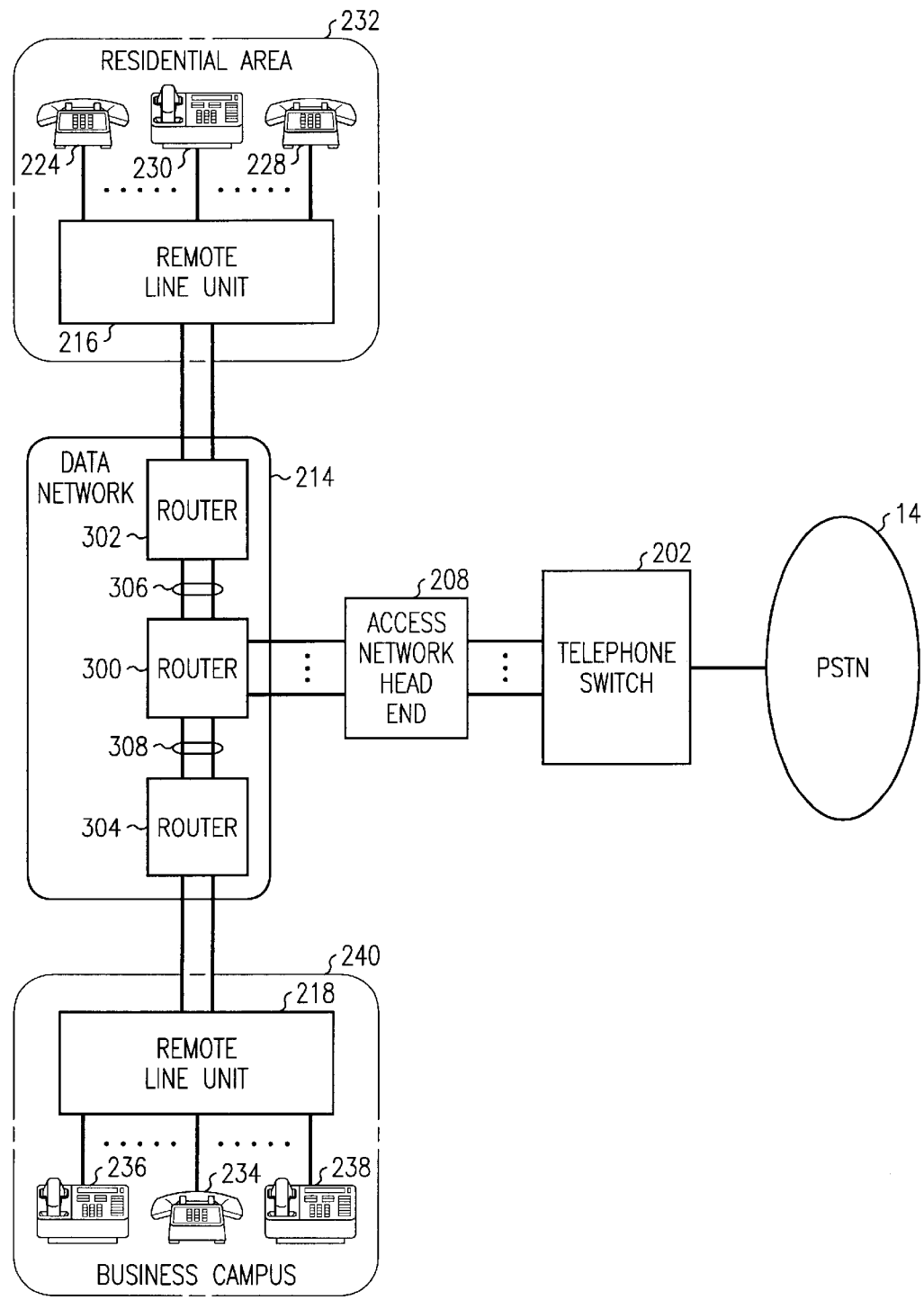
FIG. 4 is a block diagram of the system of FIG. 2 in which the bandwidth through the network has been reallocated.

FIG. 4 illustrates the same system 200 as FIG. 3. However, router 300 has now allocated a larger pipe 306 to router 302 to support the residential area, for example, on a week day evening or a weekend. Further, if, for example, there is an emergency within residential area 232 during the day, it is expected that communication traffic to and from residential area 232 would increase. It is envisioned that this invention would provide the flexibility required to adjust the bandwidth up to the maximum accorded to router 300 in order to accommodate abnormal conditions.

Thus, this invention provides a much more flexible transmission system than the prior art. There is no dedicated bandwidth to the remote line units. In fact, the bandwidth is variable according to time of day traffic patterns, etc. Thus, by use of either a pre-existing data network 214 or a data network installed for this and other purposes, operating companies may support a plurality of communications, terminations with far more flexibility than has been achievable in the past.

Figure 5:
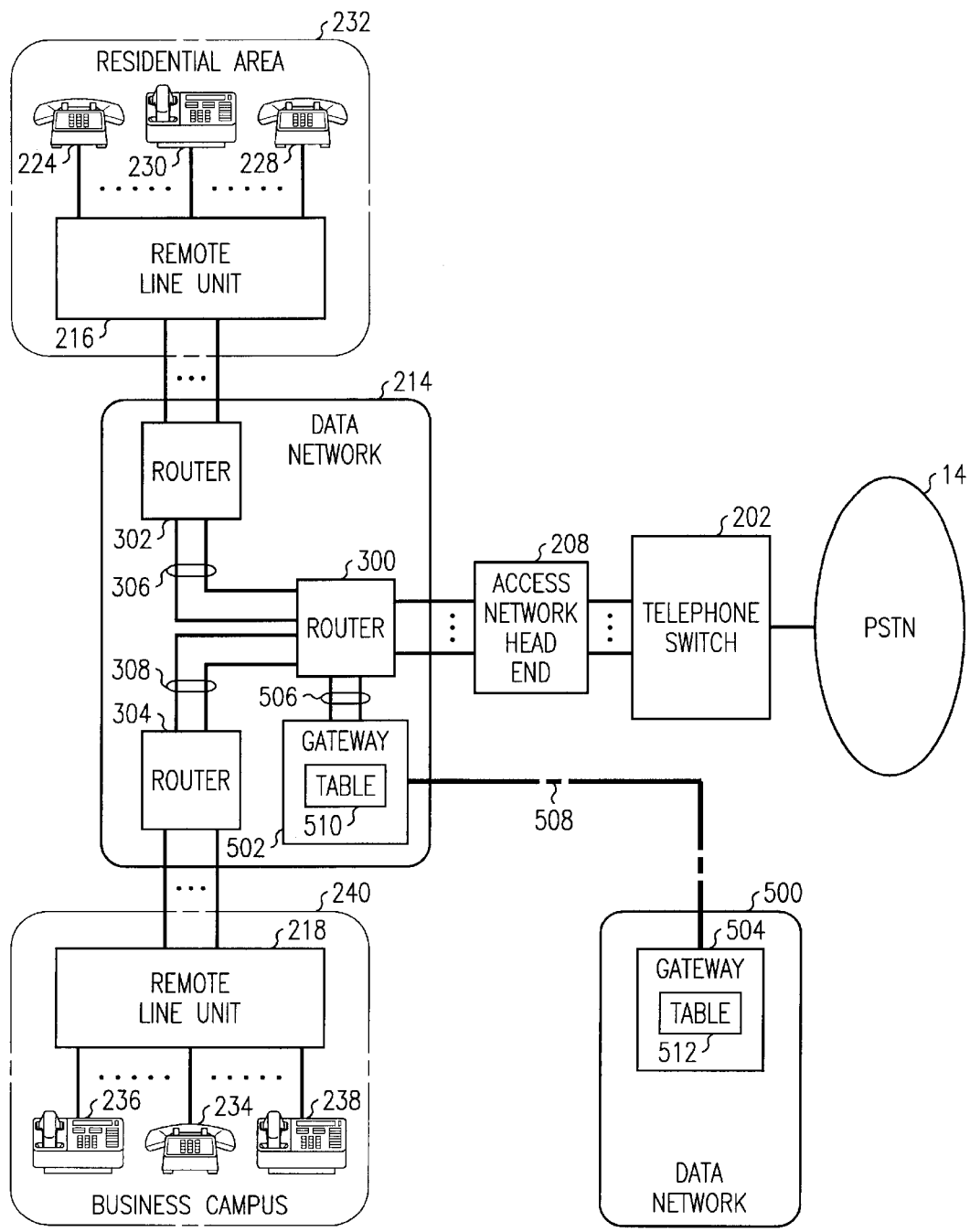
FIG. 5 illustrates allocation of bandwidth when communicating with a second data network.

FIG. 5 illustrates a further expanded data network which could support for example number portability. In this exemplary embodiment, in addition to data network 214, there is a second data network, data network 500. Data network 214 is connected to data network 500 via gateway 502 and gateway 504 located in data network 500. Router 300 allocates a certain amount of bandwidth 506 according to the needs of communicating with data network 500. In this exemplary embodiment if a telephone call arrives at telephone switch 202 from PSTN 14 destined for a telephone number that is not local to the switch, telephone switch 202 allocates a path to gateway 502 which connects via link 508 (a trunk optical length or other data link to gateway 504). A table 510 in gateway 502 indicates where the call is to be delivered. A similar table 512 in gateway 504 then further directs the call to the appropriate remote line unit switch or other destination.

It is to be understood that the above-described embodiment is merely an illustrative principle of the invention, and that many variations may be devised by those skilled in the art without departing from the scope of this invention. It is, therefore, intended that such variations be included within the scope of following claims.

What is claimed is:

1. A telecommunication system for providing service to a plurality of wireline terminals comprising:
   a telephone switch configured to provide telephony service to said plurality of wireline terminals;
   a data network carrying bearer channels defining a reserved bandwidth of the data network;
   a first line unit and a second line unit connected to the plurality of wireline terminals and the data network; and
   an access network head end connected to said telephone switch and said data network and configured to allocate portions of said reserved bandwidth to said first line unit and said second line unit, thereby defining allocated portions of bandwidth, the access network head end being adapted to periodically change said allocated portions to support traffic patterns anticipated for said first line unit and said second line unit based on time of day.

2. A telecommunications system according to claim 1 wherein said data network comprises a packet network.

3. A telecommunications system according to claim 1 wherein said data network comprises an ATM network.

4. A telecommunications system according to claim 1 wherein the telephone switch and the access network head end communicate via a standard protocol.

5. The telecommunications system of claim 1 wherein the first and second line units each comprise remote line units serving one of a residential area and business campus.

6. A telecommunication system for providing service to a plurality of wireline terminals comprising:
   a telephone switch configured to provide telephony service to said plurality of wireline terminals;
   a data network carrying bearer channels defining a reserved bandwidth of the data network;
   a first line unit and a second line unit connected to the plurality of wireline terminals and the data network; and
   an access network head end connected to said telephone switch and said data network and configured to allocate portions of said reserved bandwidth to said first line unit and said second line unit, thereby defining allocated portions of bandwidth, the access network head end being adapted to periodically change said allocated portions to support traffic patterns anticipated for said first line unit and said second line unit based on day of week.

7. A method for controlling a telecommunications network that comprises a switch connected to a data network via an access network head end and a plurality of line units connected to said data network, said method comprising:
   reserving a predetermined bandwidth limit in said data network;
   allocating a portion of said predetermined bandwidth for expected communication with each of said plurality of line units, thereby defining respective allocated portions of bandwidth; and
   varying said allocated portions of bandwidth to support traffic patterns anticipated for said first line unit and said second line unit based on time of day.

8. A method for controlling a telecommunications network that comprises a switch connected to a data network via an access network head end and a plurality of line units connected to said data network, said method comprising:
   reserving a predetermined bandwidth limit in said data network;
   allocating a portion of said predetermined bandwidth for expected communication with each of said plurality of line units, thereby defining respective allocated portions of bandwidth; and
   varying said allocated portions of bandwidth to support traffic patterns anticipated for said first line unit and said second line unit based on day of week.

9. The method of claim 7 wherein the plurality of line units each comprise remote line units serving one of a residential area and business campus.

* * * * *